UNITED STATES PATENT OFFICE.

GEORGE A. MACBETH, OF PITTSBURGH, PENNSYLVANIA, ASSIGNOR TO MACBETH-EVANS GLASS COMPANY, OF PITTSBURGH, PENNSYLVANIA, A CORPORATION OF PENNSYLVANIA.

METHOD AND BATCH OR MIXTURE FOR MAKING ILLUMINATING-GLASS.

1,097,600.  Specification of Letters Patent.  Patented May 19, 1914.

No Drawing.  Application filed May 9, 1913.  Serial No. 766,561.  REISSUED

*To all whom it may concern:*

Be it known that I, GEORGE A. MACBETH, a citizen of the United States, residing at Pittsburgh, in the county of Allegheny and State of Pennsylvania, have invented a certain new and useful Method and Batch or Mixture for Making Illuminating-Glass, of which the following is a specification.

The invention relates to a method and batch or mixture for making glass for illuminating purposes such as in electric and other shades and globes. It has for its primary objects, the provision of a process and batch which will produce a snow white glass which is not clear but which is translucent to a high degree and will transmit light without the reddish or yellow color known as fire, the glass in these respects distinguishing from the well known opal glasses which are either substantially opaque (and known as milk glass) or are to some degree translucent, in which case the coloring above referred to as fire is always noticed when light is observed through the glass; the provision of a process and batch which will produce a glass which transmits light better than the opal glasses and which is subject to a minimum amount of breakage upon the application of heat, and the provision of a batch and process which will produce a glass having a white luminous appearance when transmitting light, with such light diffused in a pleasing manner restful to the eyes, and with a minimum loss of illuminating power.

In carrying out my invention I first take a batch or mixture somewhat similar to a batch or mixture used in the manufacture of colorless clear glass, the preferred ingredients whereof will be hereinafter more particularly pointed out, and to such basic batch or mixture I add substances, one of which is preferably oxid of aluminum and the other a fluorid, preferably fluorspar, although some other fluorid might be used. The use of the oxid of aluminum with this fluorid apparently produces throughout the glass minute specks, the larger of which are ordinarily visible to the naked eye, and which have the effect of diffusing or scattering the light and giving the glass its white luminous appearance. The specks in the finished ware are elongated in shape, and I believe them to be bubbles of silicon fluorid gas held in suspension in the material and elongated during pressing or blowing the glass into molds.

In manipulating the glass batch, the duration of operation and the degree of heat must be regulated so as not to entirely obliterate the so-called specks or bubbles, which obliteration appears to result when the heating is too intense or is carried on for too long a period. I therefore stop the heating operation at a time short of the production of complete transparency and the obliteration of the specks or bubbles from the glass, the glass tending to return to its colorless crystal stage if the operation is continued too long. In carrying out the operation I have found that good results are obtained in a furnace working at a temperature of approximately 2700 degrees F., although this may be varied, and changes in temperature (as between 2500 degrees and 3000 degrees F.) may be compensated for, in a measure at least, by variations in the mixture or the length of time of the operation, which latter in many cases I have found to be less than twenty four hours.

The specific combination of ingredients in the foundation or basic mixture or batch which I have found to give the best results is as follows:

| | |
|---|---|
| Sand | 100 lbs. |
| Lead oxid | 15⅝ lbs. |
| Soda | 21¾ lbs. |
| Niter | 5½ lbs. |
| Salt | 5¼ lbs. |
| Borax | 1¼ to 2½ lbs. |

To the foregoing batch are added 18.12 pounds of hydrate of aluminum ($Al_2H_6O_6$) containing about 11.84 pounds of oxid of alumina ($Al_2O_3$) and six pounds of fluorspar ($CaF_2$). The materials are mixed together and fused as heretofore indicated.

The proportions of the oxid of alumina and the fluorid are not absolutely fixed, but may vary somewhat. The limit in the ratio of the fluorid to the oxid of alumina is reached when the resultant glass becomes an opal glass instead of a translucent glass without the fire characteristics of the opal glass. The relative proportions will also vary somewhat, depending upon the variations in the basic or foundation glass.

The glass produced by the present process is distinguished from other glasses containing fluorin, by the fact that the glass of the present process is translucent and yet without the characteristic known as fire of opal, whereas the fluorid glasses as heretofore produced were all properly definable as milk or opal glasses, being either white and opaque, or else partially opaque and showing with transmitted light a reddish or yellow color known to the trade as fire and bearing a resemblance to the color in natural opals.

What I claim is:

1. The herein described method of manufacturing illuminating glass, which consists in fusing together a foundation mixture capable of making substantially colorless clear glass with an aluminum oxid compound, and a fluorid, the quantity of the aluminum oxid compound by weight being greater than that of the fluorid, and the amount of aluminum by weight contained in the aluminum oxid compound being greater than that of the fluorin contained in the fluorid, and the heating operation being stopped before the glass returns to a clear glass stage and before the specks are eliminated.

2. The herein described method of manufacturing illuminating glass, which consists in fusing together a foundation mixture capable of making substantially colorless clear glass and including a chlorid, with an aluminum compound and a fluorin compound, the quantity by weight of the aluminum contained in the aluminum compound being greater than that of the fluorin contained in the fluorin compound, and the heating operation being stopped before the glass returns to a clear glass stage and before the specks are eliminated.

3. The herein described mixture for manufacturing illuminating glass, which consists in a foundation mixture capable of making substantially colorless clear glass, oxid of aluminum and a fluorid, in the following quantities by weight—150 parts of the foundation mixture, 9 to 15 parts of oxid of aluminum, and 3 to 8 parts of the fluorid.

4. The herein described mixture for manufacturing illuminating glass, which consists in a batch containing 150 parts by weight of the foundation mixture capable of making substantially colorless clear glass, a compound containing aluminum and a compound containing fluorin, the quantity of the aluminum in the batch by weight being from 4 to 8 parts, and the quantity of fluorin in the batch by weight ranging from 2 to 4 parts.

5. The herein described mixture for manufacturing illuminating glass, which consists in a foundation mixture capable of making substantially colorless clear glass and including chlorid, an aluminum compound, and a fluorin compound, the amount of aluminum by weight contained in the aluminum compound being greater than that of the fluorin contained in the fluorin compound, and the weight of the aluminum and fluorin combined being at least 1% of that of the entire mixture.

6. The herein described mixture for manufacturing illuminating glass, which consists in a foundation mixture capable of making substantially colorless clear glass, an aluminum compound and a fluorin compound, the amount of fluorin by weight contained in the fluorin compound being less than 1% of that of the aluminum contained in the aluminum compound, and the weight of aluminum and fluorin compound combined being at least 1% of that of the entire mixture.

7. The herein described mixture for manufacturing illuminating glass, which consists in a foundation mixture capable of making substantially colorless clear glass, an aluminum compound and a fluorin compound, the amount of aluminum by weight contained in the aluminum compound being greater than that of the fluorin contained in the fluorin compound, and the weight of the aluminum and fluorin combined being at least 1% of that of the entire mixture.

In testimony whereof I have hereunto signed my name in the presence of the two subscribed witnesses.

GEORGE A. MACBETH.

Witnesses:
 ARCHWORTH MARTIN,
 LETITIA A. MYERS.